United States Patent
Krames et al.

(10) Patent No.: US 12,286,576 B2
(45) Date of Patent: Apr. 29, 2025

(54) LUMINESCENT COMPOSITION

(71) Applicant: SEABOROUGH MATERIALS IP I B.V., Amsterdam (NL)

(72) Inventors: Michael Krames, Mountain View, CA (US); Marie Anne Van De Haar, Weesp (NL)

(73) Assignee: Seaborough Materials IP B.V., Amsterdam (NL)

( * ) Notice: Subject to any disclaimer, the term of this patent is extended or adjusted under 35 U.S.C. 154(b) by 1019 days.

(21) Appl. No.: 17/184,619

(22) PCT Filed: Sep. 13, 2019

(86) PCT No.: PCT/EP2019/074568
§ 371 (c)(1),
(2) Date: Feb. 25, 2021

(87) PCT Pub. No.: WO2020/053427
PCT Pub. Date: Mar. 19, 2020

(65) Prior Publication Data
US 2022/0403237 A1    Dec. 22, 2022

(30) Foreign Application Priority Data

Sep. 14, 2018   (EP) ..................... 18194530

(51) Int. Cl.
C09K 11/77 (2006.01)
(52) U.S. Cl.
CPC .......... C09K 11/7774 (2013.01); C09K 11/77 (2013.01)
(58) Field of Classification Search
CPC ..................................... C09K 11/77
See application file for complete search history.

(56) References Cited

U.S. PATENT DOCUMENTS

2012/0037885 A1   2/2012  Schardt et al.
2014/0362557 A1  12/2014  Ulasyuk

FOREIGN PATENT DOCUMENTS

| | | |
|---|---|---|
| CN | 1713042 A | 12/2005 |
| CN | 101243557 A | 8/2008 |
| CN | 104272014 A | 1/2015 |
| EP | 2937315 A1 | 10/2015 |
| JP | 2005-075867 A | 3/2005 |
| JP | 2006-010790 A | 1/2006 |
| JP | 2009-024082 A | 2/2009 |
| JP | 2009-035673 A | 2/2009 |
| JP | 2015-221843 A | 12/2015 |
| KR | 20140092428 A | 7/2014 |
| WO | 2007020556 A1 | 2/2007 |
| WO | 2011117791 A1 | 9/2011 |
| WO | 2014/097527 A1 | 6/2014 |
| WO | 2018/073441 A1 | 4/2018 |

OTHER PUBLICATIONS

Zhao Mingxia, et al., "The generation of energy transfer from Ce3+ to Eu3+ in LaPO4:Ce3+ /Tb3+ / Eu3 + phosphors", Journal of Luminescence 194, Available online Oct. 16, 2017, Elsevier B.V.
Yuan Chen et al., Modern functional materials, Chongquin University Press, Edition 2, Jun. 30, 2012, p. 132.

*Primary Examiner* — Peter F Godenschwager
(74) *Attorney, Agent, or Firm* — David P. Owen; Hoyng Rokh Monegier B.V.

(57) ABSTRACT

The invention relates to lighting emitting devices and systems comprising a luminescent composition, said luminescent composition comprising: (i) a first emitting material, said first emitting material having a host lattice doped with $EU^{3+}$ ions; (ii) a second emitting material, said second emitting material having a host lattice doped with $Tb^{3+}$ ions; and (iii) sensitizer material, which sensitizer material is excitable in the violet-to-blue (400 to 480 nm) wavelength range and has an emission spectrum which overlaps at least partly with one or more excitation bands of the first emitting material and with which overlaps at least partly with one or more excitation bands of the second emitting material.

18 Claims, 7 Drawing Sheets

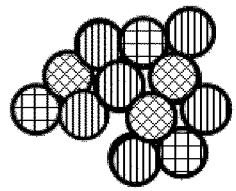

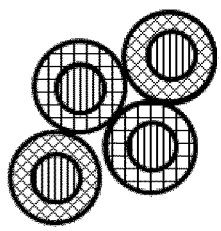

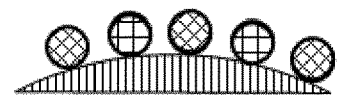

a) Acceptor nanoparticles mixed with first and second emitter ion nanoparticles.

FIGURE 1a b) Acceptor nanoparticle cores with first and second emitter ion shells.

⊞ = first emitter ion material
⊠ = second emitter ion material
⊞ = acceptor ion material FIGURE 1b c) Large-particle acceptor material integrated to first and second emitter ion nanoparticles.

⊞ = first emitter ion material
⊠ = second emitter ion material
⊞ = acceptor ion material FIGURE 1c ing of oxides, fluorides, nitrides, borates, garnets, molybdates, phosphates, vanadates, chlorides, sulfides, selenides, silicates, aluminates, oxyfluorides, fluorosilicates, oxychlorides, oxynitrides, oxysulfides, oxyselenides, fluorochlorides, and fluorobromides or combinations of thereof.

LUMINESCENT COMPOSITION

FIELD OF THE INVENTION

The invention relates to a luminescent composition, a light-emitting device comprising the luminescent composition and a lighting system comprising the light-emitting device.

BACKGROUND OF THE INVENTION

Color metrics for spectra used in general lighting have undergone significant re-examination in recent years. The commonly used Color Rendering Index (CRI) is beginning to lose favor, especially regarding guiding preferred color rendering performance, as evidenced by several examples wherein, in clinical studies, subjects preferred scenes illuminated by low CRI spectra rather than high CRI spectra.

The Illuminating Engineering Society of North America (IESNA) recently formed a committee to re-evaluate color rendering, and eventually published TM-30-15, a test method to quantify both color fidelity (Rf) and color saturation or gamut (Rg) simultaneously for any given spectrum. This method had several improvements over CRI, including an accurate model of human color vision (CAM02-UCS), a broadened standardized set of color samples: (99 vs. CRI's 8), and a framework for dealing with the fundamental trade-off between fidelity and gamut.

While TM-30-15 gives tools for quantifying Rf and Rg, it does not give strong clues as to what is preferred.

The US Department of Energy (DOE) performed a study to better understand color preference [Royer M P et al., "Human perceptions of colour rendition vary with average fidelity, average gamut, and gamut shape," Lighting Research & Technology, Vol 49, Issue 8, pp. 966-991 (2016)]. Using the TM-30-15 framework, and based on experimental human observer studies, the authors arrived at the following preference formula:

$$\text{Preference} = 7.446 - 0.041\,Rf - 9.99\,Rcs,h16 - 0.90\,Rcs,h16^2 + 106.6\,Rcs,h16^3 \quad \text{(Equation 1)}$$

wherein Rf is the TM-30-15 color fidelity measure and Rcs,h16 is the hue angle bin 16 chroma shift, often referred to as "red chroma shift".

Eqn. 1 relates the preference of a light source to a combination of its fidelity and degree of red chroma shift, which was found to drive preference of subjects in clinical studies.

There is a need for a luminescent material which is capable of simultaneously providing a high color preference as defined by equation 1 and high a Lumen Equivalent of Radiation (LER). The present invention satisfies this need.

SUMMARY OF THE INVENTION

The invention provides a luminescent composition, said luminescent composition comprising:
(i) a first emitting material, said first emitting material having a host lattice doped with $Eu^{3+}$ ions;
(ii) a second emitting material, said second emitting material having a host lattice doped with $Tb^{3+}$ ions; and
(iii) sensitizer material, which sensitizer material is excitable in the violet to blue (400 to 480 nm) wavelength range and has an emission spectrum which overlaps at least partly with one or more excitation bands of the first emitting material and which overlaps at least partly with one or more excitation bands of the second emitting material.

Surprisingly it is found that this composition, in combination with blue light which may be supplied by an excitation source for exciting the luminescent composition, enables simultaneously providing a high color preference as defined by equation 1 and a high Lumen Equivalent of Radiation (LER).

BRIEF DESCRIPTION OF THE DRAWINGS

FIGS. 1a, b, c provide three exemplary configurations of the luminescent composition according to the invention.

DETAILED DESCRIPTION OF THE INVENTION

Figure 2:
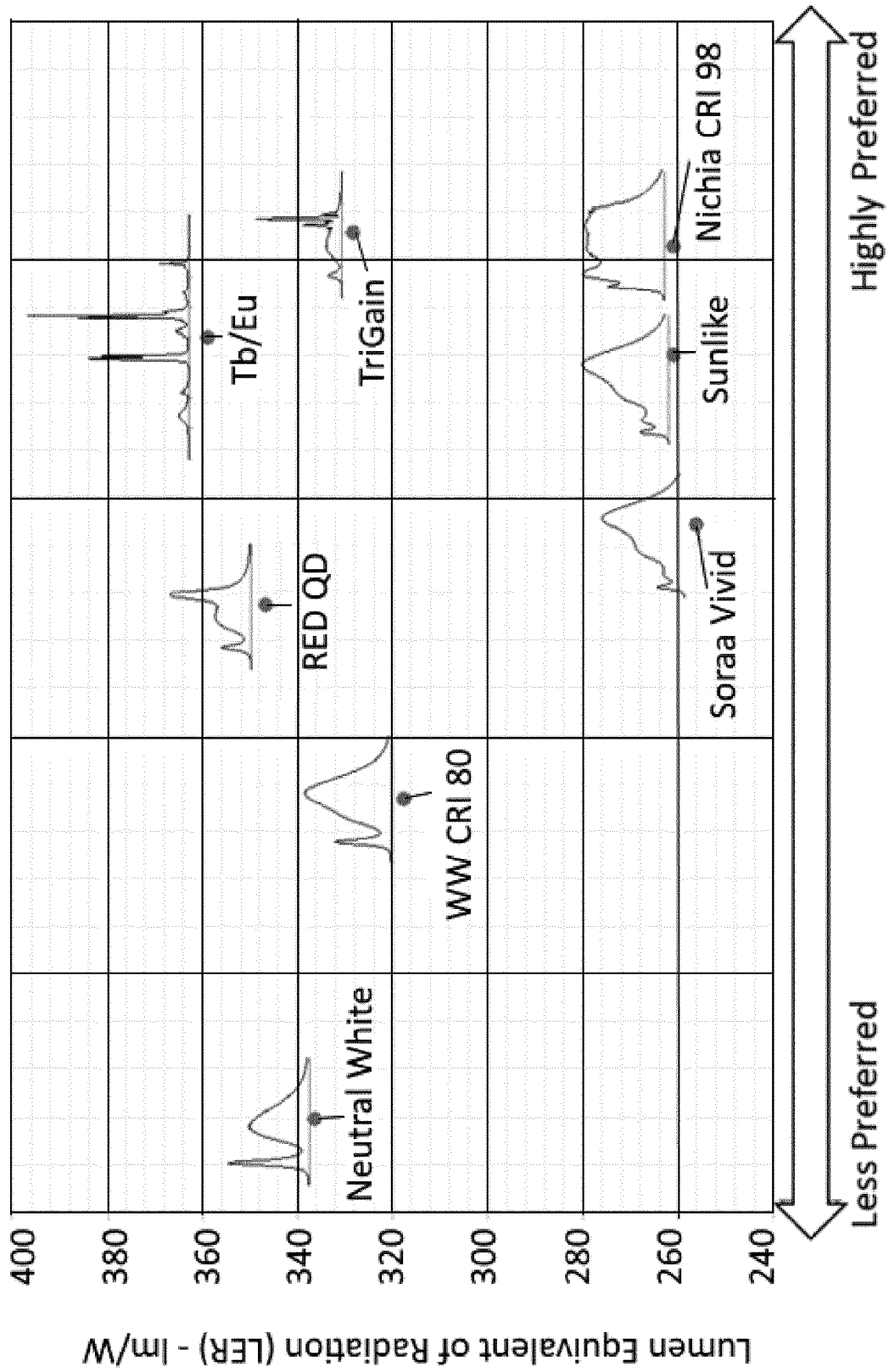
FIG. 2 provides the color preference and Lumen Equivalent of Radiation (LER) corresponding to various spectra.

The first emitting material has a host lattice doped with $Eu^{3+}$ ions.

Any suitable host lattice may be used in which $Eu^{3+}$ may be incorporated. The first emitting material may for instance have a host lattice selected from the group consisting of oxides, fluorides, nitrides, borates, garnets, molybdates, phosphates, vanadates, chlorides, sulfides, selenides, silicates, aluminates, oxyfluorides, fluorosilicates, oxychlorides, oxynitrides, oxysulfides, oxyselenides, fluorochlorides, and fluorobromides or combinations of thereof. Preferably, the first emitting material has a host lattice selected from the group consisting the oxides, phosphates, vanadates or combination thereof. More preferably, the first emitting material has a host lattice selected from the group consisting of $Y_2O_3$, $YVPO_4$, $YVO_4$ or $LaPO_4$.

Preferably, the first emitting material has a host lattice doped at a doping level of, 5-80% $Eu^{3+}$, preferably 10-50% $Eu^{3+}$, for instance 2-30% $Eu^{3+}$, such as 5-15% $Eu^{3+}$.

The second emitting material has a host lattice doped with $Tb^{3+}$ ions.

Any suitable host lattice may be used in which $Tb^{3+}$ may be incorporated. The second emitting material may for instance have a host lattice selected from the group consisting of oxides, fluorides, nitrides, borates, garnets, molybdates, phosphates, vanadates, chlorides, sulfides, selenides, silicates, aluminates, oxyfluorides, fluorosilicates, oxychlorides, oxynitrides, oxysulfides, oxyselenides, fluorochlorides, and fluorobromides or combinations of thereof. Preferably, the second emitting material has a host lattice selected from the group consisting the oxides, phosphates, vanadates or combination thereof. More preferably, the second emitting material has a host lattice selected from the group consisting of $Y_2O_3$, $YVPO_4$, $YVO_4$ or $LaPO_4$.

Preferably, the second emitting material has a host lattice doped at a doping level of 5-100% $Tb^{3+}$, more preferably 20-50% $Eu^{3+}$.

In an exemplary embodiment, the first emitting material and second emitting material are selected from the group consisting of (Ca,Sr)Ga2O6:Eu3+ (or Tb3+), (Ca,Sr,Ba)La2Bi2(SiO4)3O:Eu3+ (or Tb3+), (Ca,Sr,Ba)SnO3:Eu3+ (or Tb3+), (Ca,Y,Gd)MoO4:Eu3+ (or Tb3+), (Y,Gd)BO3 (pseudo-vaterite):Eu3+ (or Tb3+), (Y,Tb)SiO5:Eu3+ (or Tb3+), A-La2O3:Eu3+ (or Tb3+), Ba2(SiO4):O2-:Eu3+ (or Tb3+), Ba2MgSi2O7:Eu3+ (or Tb3+), Ba2Y(BO3)2Cl:Eu3+ (or Tb3+), Ba3(PO4)2:Eu3+ (or Tb3+), Ba3Ca3(PO4)4:Eu3+ (or Tb3+), Ba3Gd(BO3)3:Eu3+ (or Tb3+), Ba3Gd2(BO3)4:Eu3+ (or Tb3+), Ba3La2(BO3)4:Eu3+ (or Tb3+), Ba3V2O8:Eu3+ (or Tb3+), Ba3Y2(BO3)4:Eu3+ (or Tb3+), BaB8O13:Eu3+ (or Tb3+), BaBPO5:Eu3+ (or Tb3+), BaFCl:Eu3+ (or Tb3+), BaGd2 O4:Eu3+ (or Tb3+), BaGd4Si5O17:Sm:Eu3+ (or Tb3+), BaGdB9O16:Eu3+ (or Tb3+), BaLaB9O16:Eu3+ (or Tb3+), BaSO4:Eu3+ (or Tb3+), BaY2F8:Yb:Eu3+ (or Tb3+), BaY2Si3O10:Eu3+ (or Tb3+), BaYB9O16:Eu3+ (or Tb3+), BaZr(BO3)2:Eu3+ (or Tb3+), BaZrO3:Eu3+ (or Tb3+), BaZrO3:Eu3+ (or Tb3+), b-BaB2O4:Eu3+ (or Tb3+), B-Gd2O3:Eu3+ (or Tb3+), Ca2Al(AlSiO7):Eu3+ (or Tb3+), Ca2Gd2(GeO4)2O:Eu3+ (or Tb3+), Ca2Gd8(SiO4)6O2:Eu3+ (or Tb3+), Ca2Gd8Si6O26:Eu3+ (or Tb3+), Ca2La8(SiO4)6O2:Eu3+ (or Tb3+), Ca3(BO3)2:Eu3+ (or Tb3+), Ca3Al2O6:Eu3+ (or Tb3+), Ca3Gd2(BO3)4:Eu3+ (or Tb3+), Ca3La2(BO3)4:Eu3+ (or Tb3+), Ca3Y2(BO3)4:Eu3+ (or Tb3+), Ca4GdO(BO3)3:Eu3+ (or Tb3+), Ca5(PO11)3F:Eu3+ (or Tb3+), Ca5(PO4)3Br:Eu3+ (or Tb3+), Ca5(PO4)3F:(4f-site):Eu3+ (or Tb3+), Ca5(PO4)3F:(6h-site):Eu3+ (or Tb3+), Ca5(PO4)3OH:Eu3+ (or Tb3+), CaBPO5:Eu3+ (or Tb3+), CaLaB7O13:Eu3+ (or Tb3+), calcite-CaCO3: Eu3+ (or Tb3+), CaO:Eu3+ (or Tb3+), CaSO4:Eu3+ (or Tb3+), CaYO(BO3):Eu3+ (or Tb3+), C-Gd2O3:Eu3+ (or Tb3+), C—Lu2O3:(C2):Eu3+ (or Tb3+), C—Lu2O3:(C3i):Eu3+ (or Tb3+), Cs2NaYF6:Tm:Eu3+ (or Tb3+), C-Sc2O3:Yb:Eu3+ (or Tb3+), C-Y2O3:Eu3+ (or Tb3+), Eu3+ (or Tb3+)[(ttfa)3(phen)]0:Eu3+ (or Tb3+), Gd17.33(BO3)4(B2O5)2O16:Eu3+ (or Tb3+), Gd2BaZnO5:Eu3+ (or Tb3+), Gd2O2(SO4):Eu3+ (or Tb3+), Gd2P4O13:Eu3+ (or Tb3+), Gd3O4Br:Eu3+ (or Tb3+), Gd3PO7:Eu3+ (or Tb3+), Gd3Te2Li3O12:Eu3+ (or Tb3+), Gd8P2O17:Eu3+ (or Tb3+), GdAl3 (BO3)4:Eu3+ (or Tb3+), GdAlO3:Eu3+ (or Tb3+), GdAlO3:Eu3+ (or Tb3+), GdB3O6:Eu3+ (or Tb3+), GdBO3:Eu3+ (or Tb3+), GdGaO3:Eu3+ (or Tb3+), GdOBr:Eu3+ (or Tb3+), GdOCl:Eu3+ (or Tb3+), GdP3O9:Eu3+ (or Tb3+), GdPO4:Eu3+ (or Tb3+), I-CaB2O4:Eu3+ (or Tb3+), InBO3:Eu3+ (or Tb3+), I-SrB2O4:Eu3+ (or Tb3+), KCaGd(PO4)2:Eu3+ (or Tb3+), La26O27(BO3)8:Eu3+ (or Tb3+), La2BaZnO5:Eu3+ (or Tb3+), La2Hf2O7:Eu3+ (or Tb3+), La2O2(SO4):Eu3+ (or Tb3+), La2O2S:Eu3+ (or Tb3+), La2O2S:Eu3+ (or Tb3+), La2W3O12:Eu3+ (or Tb3+), La2Zr3(MoO4)9:Eu3+ (or Tb3+), La3TaO4Cl6:Eu3+ (or Tb3+), La3TaO4Cl6:Eu3+ (or Tb3+), La3WO6Cl3:Eu3+ (or Tb3+), La3WO6Cl3:Eu3+ (or Tb3+), LaAlO3:Eu3+ (or Tb3+), LaAlO3:Eu3+ (or Tb3+), LaB3O6:Eu3+ (or Tb3+), LaBO3:Eu3+ (or Tb3+), LaF3:Eu3+ (or Tb3+), LaF3:Eu3+ (or Tb3+), LaGaO3:Eu3+ (or Tb3+), LaMgB5O10:Eu3+ (or Tb3+), LaOBr:Eu3+ (or Tb3+), LaOCl:Eu3+ (or Tb3+), LaOF:Eu3+ (or Tb3+), LaOI:Eu3+ (or Tb3+), LaP3O9:Eu3+ (or Tb3+), LaPO4:Eu3+ (or Tb3+), LaYO3:Eu3+ (or Tb3+), Li2Lu5O4(BO3)3:Eu3+ (or Tb3+), Li3Ba2La3(MoO4)8:Eu3+ (or Tb3+), Li3La2(BO3)3:Eu3+ (or Tb3+), Li6Gd(BO3)3:Eu3+ (or Tb3+), Li6Y(BO3)3:Eu3+ (or Tb3+), LiCaAlF6:Eu3+ (or Tb3+), LiEu3+ (or Tb3+)Mo2O8:Eu3+ (or Tb3+), LiGd6O5(BO3)3:Eu3+ (or Tb3+), LiGdF4:Eu3+ (or Tb3+), LiGdGeO4:Eu3+ (or Tb3+), LiGdO2:Eu3+ (or Tb3+), LiGdSiO4:Eu3+ (or Tb3+), LiLa2O2BO3:Eu3+ (or Tb3+), LiLaGeO4:Eu3+ (or Tb3+), LiLaO2:Eu3+ (or Tb3+), LiLaP4O12:Eu3+ (or Tb3+), LiLaSiO4:Eu3+ (or Tb3+), LiLuGeO4:Eu3+ (or Tb3+), LiLuO2:Eu3+ (or Tb3+), LiLuSiO4:Eu3+ (or Tb3+), LiScO2:Eu3+ (or Tb3+), LiSr2YO4:Eu3+ (or Tb3+), LiSrAlF6:Eu3+ (or Tb3+), LiSrAlF6:Eu3+ (or Tb3+), LiY6O5(BO3)3:Eu3+ (or Tb3+), LiYF4:Eu3+ (or Tb3+), LiYGeO4:Eu3+ (or Tb3+), LiYO2:Eu3+ (or Tb3+), LiYSiO4:Eu3+ (or Tb3+), Lu2O2(SO4):Eu3+ (or Tb3+), Lu2Si2O7:Eu3+ (or Tb3+)3+(or Tb3+), Lu3Al5O12:Eu3+ (or Tb3+), Lu3Al5O12:Yb:Eu3+ (or Tb3+), LuBO3:Eu3+ (or Tb3+), LuBO3 (calcite):Eu3+ (or Tb3+), LuOCl:Eu3+ (or Tb3+), LuPO4:Eu3+ (or Tb3+), Mg2Gd8(SiO4)6O2:Eu3+ (or Tb3+), Mg2La8(SiO4)6O2:Eu3+ (or Tb3+), MgO:Eu3+ (or Tb3+), MgSiO3:Eu3+ (or Tb3+), Na3YSi3O9:Eu3+ (or Tb3+), Na6Gd(BO3)3:Eu3+ (or Tb3+), NaGdGeO4:Eu3+ (or Tb3+), NaGdO2:Eu3+ (or Tb3+), NaGdSiO4:Eu3+ (or Tb3+), NaGdSiO4:Eu3+ (or Tb3+), NaLaGeO4:Eu3+ (or Tb3+), NaLaO2:Eu3+ (or Tb3+), NaLaSiO4:Eu3+ (or Tb3+), NaLuGeO4:Eu3+ (or Tb3+), NaLuSiO4:Eu3+ (or Tb3+), NaScO2:Eu3+ (or Tb3+), NaSrLa(VO4)2:Eu3+ (or Tb3+), NaYGeO4:Eu3+ (or Tb3+), NaYSiO4:Eu3+ (or Tb3+), ScBO3:Eu3+ (or Tb3+), ScOCl:Eu3+ (or Tb3+), ScPO4:Eu3+ (or Tb3+), Sr2B2O5:Eu3+ (or Tb3+), Sr2Gd8(SiO4)6O2:Eu3+ (or Tb3+), Sr2La2Zn2O7:Eu3+ (or Tb3+), Sr2La2Zn2O7:Eu3+ (or Tb3+), Sr2LaAlO5:Eu3+ (or Tb3+), Sr3(BO3)2:Eu3+ (or Tb3+), Sr3(PO4)2:Eu3+ (or Tb3+), Sr3(PO4)2:Sm:Eu3+ (or Tb3+), Sr3Gd2(BO3)4:Eu3+ (or Tb3+), Sr3La2(BO3)4:Eu3+ (or Tb3+), Sr3La6(SiO4)6:Eu3+ (or Tb3+), Sr3Y2(BO3)4:Eu3+ (or Tb3+), Sr5(PO4)3F:Eu3+ (or Tb3+), Sr9Ln(VO4)7:Eu3+ (or Tb3+), SrAl2B2O7:Eu3+ (or Tb3+), SrB4O7:Eu3+ (or Tb3+), SrB6O10:Eu3+ (or Tb3+), SrCO3:Eu3+ (or Tb3+), SrGdAlO4:Eu3+ (or Tb3+), SrHfO3:Tm:Eu3+ (or Tb3+), SrLa2BeO5:(4c):Eu3+ (or Tb3+), SrLa2BeO5:(8d):Eu3+ (or Tb3+), SrLaAlO4:Eu3+ (or Tb3+), SrLaGa3O7:Eu3+ (or Tb3+), SrLaO(BO3):Eu3+ (or Tb3+), SrO:Eu3+ (or Tb3+), SrY2O4:(Sr-site):Eu3+ (or Tb3+), SrY2O4:(Y-site1):Eu3+ (or Tb3+), SrY2O4:(Y-site2):Eu3+ (or Tb3+), Tb2Mo3O12:Eu3+ (or Tb3+), Tb2W3O12:Eu3+ (or Tb3+), TbBO3:Eu3+ (or Tb3+), ThO2:Eu3+ (or Tb3+), X1-Gd2SiO5:Eu3+ (or Tb3+), X1-Y2SiO5:Eu3+ (or Tb3+), X2-Y2SiO5:Eu3+ (or Tb3+), Y17.33(BO3)4(B2O5)2O16:Eu3+ (or Tb3+), Y2Ge2O7:Eu3+ (or Tb3+), Y2GeO5:Eu3+ (or Tb3+), Y2O2(SO4):Eu3+ (or Tb3+), Y2O2S:Eu3+ (or Tb3+), Y2O2S:Eu3+ (or Tb3+), Y2O3:Eu3+ (or Tb3+), Y2P4O13:Eu3+ (or Tb3+), Y2Si2O7:Eu3+ (or Tb3+), Y2SiO5:Eu3+ (or Tb3+), Y3Al5O12:Eu3+ (or Tb3+), Y3Ga5O12:Eu3+ (or Tb3+), Y3O4Br:Eu3+ (or Tb3+), Y3O4Cl:Eu3+ (or Tb3+), Y3PO7:Eu3+ (or Tb3+), Y4GeO8:Eu3+ (or Tb3+), Y8P2O17:Eu3+ (or Tb3+), YAl3(BO3)4:Eu3+ (or Tb3+), YAlO3:Eu3+ (or Tb3+), YAlO3:Eu3+ (or Tb3+), YBO3:Eu3+ (or Tb3+), YbOBr:Yb:Eu3+ (or Tb3+), YF3:Eu3+ (or Tb3+), YOBr:

Eu3+ (or Tb3+), YOCl:Eu3+ (or Tb3+), YOCl:Eu3+ (or Tb3+), YOF:Eu3+ (or Tb3+), YOF:Eu3+ (or Tb3+), YP3O9:Eu3+ (or Tb3+), YPO4:Eu3+ (or Tb3+), YPO4:Eu3+ (or Tb3+), YTaO4:Eu3+ (or Tb3+), YVO4:Eu3+ (or Tb3+), ZrP2O7:Eu3+ (or Tb3+), or mixtures thereof.

The skilled person will understand that, as used herein, the notation Eu3+ (or Tb3+) indicates that Eu3+ is applicable to the first emitting material and Tb3+ is applicable to the second emitting material.

The sensitizer material is excitable in the violet-to-blue (400 to 480 nm) wavelength range and has an emission spectrum which overlaps at least partly with one or more excitation bands of the first emitting material and which overlaps at least partly with one or more excitation bands of the second emitting material. Any suitable sensitizer material may be used which is, upon excitation the violet-to-blue (400 to 480 nm) wavelength range, capable of increasing the excitation of the first emitter material and of the second emitter material.

Figure 10:
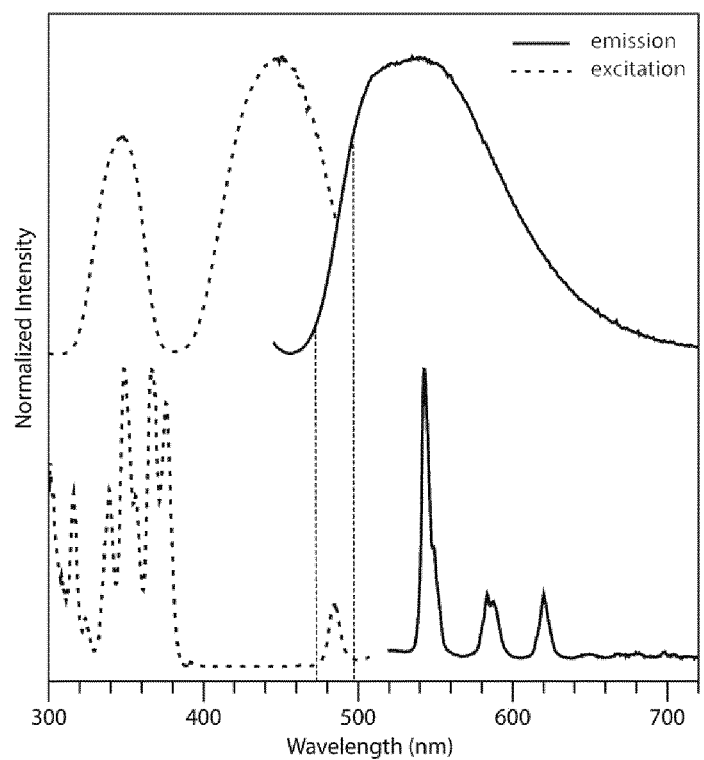
FIG. 10 shows the overlap of the emission spectrum of $Lu_3Al_5O_{12}$:Ce (0.65%) (LuAG) (upper trace) as second luminescent material and of excitation bands of $LaPO_4$:Tb (lower trace) as first luminescent material.
Figure 11:
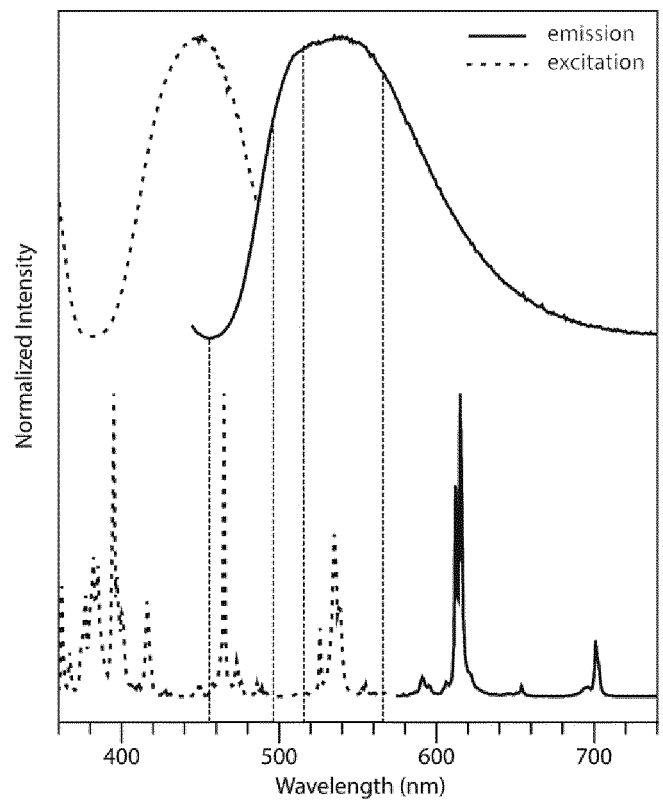
FIG. 11 shows the overlap of the emission spectrum of $Lu_3Al_5O_{12}$:Ce (0.65%) (LuAG) (upper trace) as second luminescent material and of excitation bands of $Li_3Ba_2(La_{0.6}Eu_{0.4})_3(MoO_4)_8$ (lower trace) as first luminescent material.

The skilled person is well able to determine the overlap of the spectra based on spectra known in the art or determine the spectra by routine experimentation. For instance, FIG. 10 shows the overlap of the emission spectrum of $Lu_3Al_5O_{12}$:Ce (0.65%) (LuAG) (upper trace) as sensitizer material and of excitation bands of $LaPO_4$:Tb (lower trace) as emitter material. The area of overlap is indicated between dashed lines. FIG. 11 shows the overlap of the emission spectrum of $Lu_3Al_5O_{12}$:Ce (0.65%) (LuAG) (upper trace) as sensitizer material and of excitation bands of $Li_3Ba_2(La_{0.6}Eu_{0.4})3(MoO_4)_8$ (lower trace) as emitter material. The overlapping area is indicated between dashed lines as well.

Preferably, the sensitizer material is doped with one or more ions selected from the group consisting of $Eu^{2+}$, $Pb^{2+}$, $Bi^{3+}$ and $Ce^{3+}$. More preferably the sensitizer material is doped with $Eu^{2+}$ or $Ce^{3+}$ ions, most preferably $Ce^{3+}$ ions.

In an exemplary embodiment, the second luminescent material is selected from the group consisting of $(Sr_n, Ca_{1-n})_{10}(PO_4)_6*B_2O_3$:$Eu^{2+}$ (wherein $0 \leq n \leq 1$), $(Ba,Sr,Ca)_5(PO_4)_3(Cl,F,Br,OH)$:$Eu^{2+},Mn^{2+}$, $(Ba,Sr,Ca)BPO_5$:$Eu^{2+}$, $Mn^{2+}$, $Sr_2Si_3O_8*2SrCl_2$:$Eu^{2+}$, $(Ca,Sr,Ba)_3MgSi_2O_8$:$Eu^{2+}$, $Mn^{2+}$, $BaAl_8O_{13}$:$Eu^{2+}$, $2SrO*0.84P_2O_5*0.16B_2O_3$:$Eu^{2+}$, $(Ba,Sr,Ca)MgAl_{10}O_{17}$:$Eu^{2+},Mn^{2+}$, $(Ba,Sr,Ca)A_2O_4$:$Eu^{2+}$, $(Y,Gd,Lu,Sc,La)BO_3$:$Ce^{3+},Tb^{3+}$, $(Ba,Sr,Ca)_2(Mg,Zn)Si_2O_7$:$Eu^{2+}$, $(Mg,Ca,Sr,Ba,Zn)_2Si_{1-x}O_{4-2x}$:$Eu^{2+}$ (wherein $0 \leq x \leq 0.2$), $(Sr,Ca,Ba)(Al,Ga)_2S_4$:$Eu^{2+}$, $(Ca,Sr)_8(Mg,Zn)(SiO_4)_4Cl_2$:$Eu^{2+},Mn^{2+}$, $Na_2Gd_2B_2O_7$:$Ce^{3+},Tb^{3+}$, $(Sr,Ca,Ba,Mg,Zn)_2P_2O_7$:$Eu^{2+},Mn^{2+}$, $(Ca,Sr)S$:$Eu^{2+},Ce^{3+}$, $(Y,Gd,Tb,La,Sm,Pr,Lu)_3(Sc,Al,Ga)_{5-n}O_{12-3/2n}$:$Ce^{3+}$ (wherein $0 \leq n \leq 0.5$), $(Y,Lu,Th)_3Al_5O_{12}$:$Ce^{3+}$, $(Ca, Sr) Ga_2S_4$:$Eu^{2+}$, $SrY_2S_4$:$Eu^{2+}$, $CaLa_2S_4$:$Ce^{3+}$, $(Ba,Sr,Ca)MgP_2O_7$:$Eu^{2+}$, $Mn^{2+}$, $CaWO_4$, $(Ba,Sr,Ca)_nSi_nN_n$:$Eu^{2+}$ (where $2n+4=3n$), $Ca_3(SiO_4)Cl_2$:$Eu^{2+}$, $(Y,Lu,Gd)_{2-n}Ca_nSi_4N_{6+n}C_{1+n}$:$Ce^{3+}$, (wherein $0 \leq n \leq 0.5$), $(Lu,Ca,Li,Mg,Y)$ alpha-SiAlON doped with $Eu^{2+}$ and/or $Ce^{3+}$, $(Ca,Sr,Ba)SiO_2N_2$:$Eu^{2+},Ce^{3+}$, $(Sr,Ca)AlSiN_3$:$Eu^{2+}$, $CaAlSi(ON)_3$:$Eu^{2+}$, $Sr_{10}(PO_4)_6Cl_2$:$Eu^{2+}$, $(BaSi)O_{12}N_2$:$Eu^{2+}$, $SrSi_2(O,Cl)_2N_2$:$Eu^{2+}$, $(Ba,Sr)Si_2(O,Cl)_2N_2$:$Eu^{2+}$ or mixtures thereof.

The sensitizer material(s) may have any suitable host lattice. Preferably, the host lattice has a garnet structure, more preferably the host lattice is selected from the group consisting of $Y_3Al_5O_{12}$ or $Lu_3Al_5O_{12}$ or combinations thereof. Most preferably the sensitizer material has a host lattice having a garnet structure and is doped with $Ce^{3+}$ ions, for instance $Y_3Al_5O_{12}$:$Ce^{3+}$ ("YAG:Ce") or $Lu_3Al_5O_{12}$:$Ce^{3+}$ ("LuAG:Ce") or a combination of these.

Preferably, in the case of $Ce^{3+}$ doping, the sensitizer material has a host lattice doped at a level of 0.05-5%, more preferably 0.1-4%, most preferably from 0.5-4%.

Preferably, the first emitting material, the second emitting material and the sensitizer material are so arranged to each other to allow energy transfer from the sensitizer material to the first emitting material and/or from the sensitizer material to the second sensitizer material. More preferably, the first emitting material, the second emitting material and the sensitizer material are so arranged to each other to allow energy transfer from the sensitizer material to the first emitting material and from the sensitizer material to the second sensitizer material. It has been found that energy transfer enhances the efficiency of the excitation of $Tb^{3+}$ and $Eu^{3+}$ ions.

The skilled person will understand that non-radiative energy transfer (sometimes also referred to as Fluorescent Resonance Energy Tranfer, FRET) from the sensitizer material to the emitting material involves the non-radiative transfer of energy from an excited sensitizer ion in the sensitizer material to an acceptor (or emitter) ion in the emitting material. It is evidenced by increased selective excitation of the sensitizer ion in the sensitizer material, resulting in increased emission from an emitter ion in the emitting material. It is evidenced and detectable by increased selective excitation of the sensitizer ion in the second luminescent material, resulting in increased emission from an emitter ion (Eu3+ or Tb3+) in the emitting material.

Detectable non-radiative energy transfer may be achieved in any suitable manner.

The skilled person will realize that—since resonant energy transfer is in first order inversely proportional to inter-ion distance at the power of 6—the arrangement to allow energy transfer may be effected by proper engineering of the effective distances between the sensitizer ions in the sensitizer material and the emitter ions in the emitting material.

For instance, arrangement to allow energy transfer from a sensitizer material to the emitting material may be achieved by dissolving the first material (preferably in the form of nanoparticles) and the second material (preferably in the form of nanoparticles) in a solvent, and evaporating the solvent. The resulting clusters of nanoparticles will include those of the first and second materials in close enough proximity to allow significant energy transfer between them.

Any suitable solvent may be used. The skilled person is able to select a preferred solvent considering the nature of the nanoparticles. In the event of hydrophobic nanoparticles, a non-polar solvent is preferably used. In the event of hydrophilic nanoparticles a polar solvent is preferably used. The solvent may for instance be an alcohol, such as for instance isopropanol.

The process may involve removing ligands from the nanoparticles prior to drying of the mixed nanoparticles. Removal of ligands may be effected by contacting the nanoparticles with an acid, for instance by heating, or adding HCl or an oxidizing agent (such as e.g. a base piranha solution) to the nanoparticle solution, optionally followed by one or more washing steps.

Arrangement to allow energy transfer may, for instance, also be achieved by providing the arrangements as indicated in any one of FIGS. 1a to 1c, as will be discussed hereinafter.

The composition according to the invention can be in any suitable arrangement.

Preferably, the first emitting material and/the second emitting material are in the form of nanoparticles. More preferably, the first emitting material and the second emitting material are in the form of nanoparticles. Most preferably, the first emitting material, the second emitting material and the sensitizer material are in the form of nanoparticles. An example of this embodiment has been illustrated in FIG. 1a. The arrangement, quantity ratios, and doping levels may be adjusted so that the desired ration of green ($Tb^{3+}$) and Red ($Eu^{3+}$) emission occurs. The amount and doping level of the donor material may be adjusted so that the desired amount of excitation light is absorbed. In the case of blue light excitation, these parameters may be tuned so that the desired amount of blue excitation light is leaked through the material, so that the blue light, mixed with the red and green emission light, can generate a white-light spectrum. Such a materials arrangement may be used in conjunction with a blue-emitting LED chip so as to provide a white emitting LED device, which may be combined with a power supply, optics, and thermal management system to provide a white light emitting lamp or luminaire.

Any suitable nanoparticles may be used. Suitable nanoparticles include particles of which at least one dimension is at a nanometer scale, preferably ≤100 nm. More preferably, the $D_{50}$ value of the nanoparticles is ≥1 nm and ≤50 nm, most preferably ≥2nm and ≤10 nm, as measured using transmission electron microscopy (TEM).

In another embodiment, the first emitting material is in the form of a core-shell structure, wherein the sensitizer material forms a shell around the first emitter material (e.g. in the form of nanoparticles) and/or the second emitting material (e.g. in the form of nanoparticles) is in the form of a core-shell structure, wherein the sensitizer material forms a shell around the second sensitizer material. In a more preferred embodiment, the first emitting material (e.g. in the form of nanoparticles) is in the form of a core-shell structure, wherein the sensitizer material forms a shell around the first emitter material and the second emitting material (e.g. in the form of nanoparticles) is in the form of a core-shell structure, wherein the sensitizer material forms a shell around the second sensitizer material. An example of the latter embodiment has been illustrated in FIG. 1b. Core and shell dimensions are on the nanoscale and optimized to enable FRET to the required degree. In this way, the $Tb^{3+}$ shelled materials effectively act as a green emitting phosphor, while the $Eu^{3+}$ shelled materials effectively act as a red emitting phosphor. Emission ratios and degree of blue light absorption can be tuned to generate white light as described above.

A further embodiment has been illustrated in FIG. 1c which shows that the first emitting material (e.g. in the form of nanoparticles) and the second emitting material (e.g. in the form of nanoparticles) are brought proximal to a large (e.g., several 10s, 100s, or 1000s nm) sensitizer material. In this case, it may be beneficial to dope the donor sufficiently so that efficient energy migration occurs between ions excited deep within the donor particle and those near the surface and which are thus likely to participate in FRET and give their energy to the neighboring $Tb^{3+}$ and $Eu^{3+}$ doped nanoparticles). In the cases where high dopant concentrations lead to reduced quantum yields, for instance due to large size differences between the dopant atom in comparison to the target lattice site, co-doping with a second active ion can be used to enhance energy migration from deep within the donor particle towards the surface. In this case energy migration occurs via FRET between the first and second active ions within the same donor host lattice. In a preferred embodiment YAG:$Ce^{3+}$, LuAG:$Ce^{3+}$ or a combination of these two materials are doped with <5% $Ce^{3+}$ and co-doped with up to several 10's of percent $Tb^{3+}$. Energy migration might be beneficial for smaller particles as well, as well as helpful for the emitter particles.

Emission ratios and degree of violet and/or blue light absorption can be tuned to generate white light as described above.

In all embodiments, it is possible that some residual (or engineered) donor emission will be present. This emission can be engineered within the total emission spectrum and can be used with positive effect. For example, some residual sensitizer emission (e.g. YAG:$Ce^{3+}$) might provide a broad background emission which may be beneficial for certain applications.

In an embodiment of the invention, the sensitizer material comprises a first sensitizer material and a second sensitizer material, wherein the first sensitizer material is excitable in the violet-to-blue (400 to 480 nm) wavelength range and has an emission spectrum which overlaps at least partly with one or more excitation bands of the first emitting material and the second sensitizer material is excitable in the violet-to-blue (400 to 480 nm) wavelength range and has an emission spectrum which overlaps at least partly with one or more excitation bands of the second emitting material.

In this embodiment, preferably the first emitting material, the second emitting material, the first sensitizer material and the second sensitizer material are so arranged to each other to allow energy transfer from the first sensitizer material to the first emitting material and/or from the second sensitizer material to the second emitting material.

The invention further relates to a light-emitting device comprising the luminescent material according to the invention.

The light-emitting device may comprise any suitable excitation source for exciting the sensitizer material. Preferably, the excitation source is a light emitting diode emitting in the violet to blue wavelength range (400-480 nm).

In a preferred embodiment, the light-emitting device residual light from the excitation source mixes with light from the first and second materials, to generate white light. Preferably, the spectrum of white light is characterized by a lumen equivalent of radiation that is greater than 330 lumens per Watt, more preferably greater than 340 lumens per Watt, more preferably greater than 350 lumens per Watt.

In a preferred embodiment, the sensitizer material is excitable in the violet (400-440 nm) wavelength regime. This material can be optically coupled with a violet emitting LED, and further combined with either a blue emitting LED, or a blue emitting phosphor (also excitable with the violet emitting LED). The sensitizer materials transfers its energy to the first or second emitting material by FRET. Alternatively, different sensitizer materials are used for each emitting material, with at least one of the sensitizer materials being excitable in the violet. The other sensitizer may be excitable in the violet, or blue, or both wavelength regimes. Within any of the above anticipated combinations, the final spectrum can include violet, as well as blue, green, and red emission to provide white light with the additional capability to provide excitation of standard optical brightening agents, which are found in many materials, such as white paper and apparel.

The invention further relates to alighting system comprising a light emitting device according the invention. Preferably, the light emitting device is selected from the group consisting of lamp or luminaire, office lighting systems, household application systems shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, and decorative lighting systems, portable systems, automotive applications, micro-LED based systems, and green house lighting systems.

The invention will now further be illustrated using the following examples, without however being limited thereto.

EXAMPLES

Example 1

In the following, spectra of $Eu^{3+}$ and $Tb^{3+}$ emitting ions, in combination with blue light from an InGaN-based light emitting diode, a suitable excitation source for the current invention, are simulated in linear combinations to provide a wide range of white light characteristics. In each case, the Lumen Equivalent of Radiation (LER) is calculated using the well-known CIE photopic luminosity function while the relative color preference is calculated using formula 1. The results are shown—in comparison to values calculated based on prior art spectra of prior art materials in FIG. 2 as well as in table 1,—for 3000K Correlated Color Temperature (CCT). It is seen that the material according to the invention has the highest preference combined with the highest LER (360 lm/Wopt).

TABLE 1

Preference (calculated according to formula 1) and LER for prior art spectra as well as for the spectrum according to example 1 (invention).

| Prior Art | Violet | Blue | Green/Yellow | Amber/Orange | Red | Preference | LER (lm/W) |
|---|---|---|---|---|---|---|---|
| | | Emitters* used in simulations to match prior art spectra | | | | | |
| Neutral White | — | InGaN LED | YAG:Ce3+ | — | — | 5.30 | 336 |
| WW CRI 80 | — | InGaN LED | (Lu, Y)AG:Ce3+ | (S, C)ASN:Eu2+ | — | 4.63 | 317 |
| Red QD | — | InGaN LED | (Lu, Y)AG:Ce3+ | CdS (quantum dot) | — | 4.22 | 346 |
| Soraa Vivid | InGaN LED | Oxide:Eu2+ | (Lu, Y)AG:Ce3+ | — | CASN:Eu2+ | 4.05 | 256 |
| Sunlike | InGaN LED | Oxide:Eu2+ | (Lu, Y)AG:Ce3+ | -4 | CASN:Eu2+ | 3.70 | 261 |
| Nichia CRI 98 | InGaN LED | Oxide:Eu2+ | (Lu, Y)AG:Ce3+ | (S, C)ASN:Eu2+ | KSF:Mn4+ | 3.47 | 260 |
| TriGain | — | InGaN LED | (Lu, Y)AG:Ce3+ | — | KSF:Mn4+ | 3.44 | 328 |
| | | Emitters used in simulation | | | | | |
| Example 1 (invention) | — | InGaN LED | Tb3+ | Eu3+ | — | 3.66 | 358 |

*guessed to match the prior art spectra

Example 2

Figure 3:
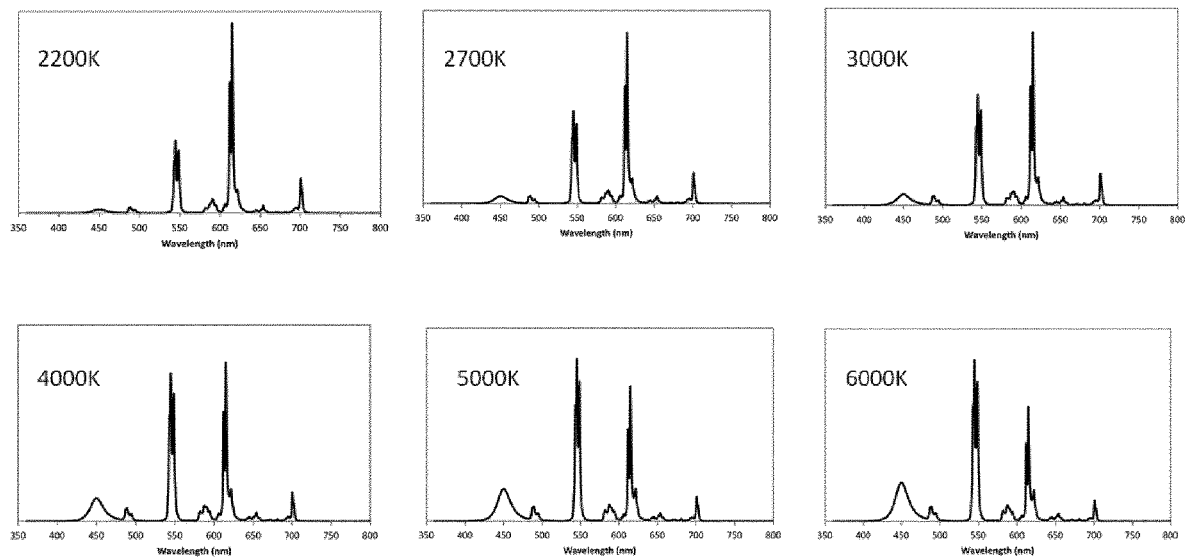
FIG. 3 provides simulation results, whereby a 450 nm blue emitting LED is used to excite targeted ratios of $Tb^{3+}$ and $Eu^{3+}$ emitters in compositions according to the invention to produce white light with Correlated Color Temperatures (CCT) from 2200K to 6000K.

This example shows that the ratios of emission can be tuned to achieve any conceivable white point. Simulation results are provided in FIG. 3, whereby a 450 nm blue emitting LED can be used to excite targeted ratios of $Tb^{3+}$ and $Eu^{3+}$ emitters, as described in this invention, to produce white light with CCTs from 2200K to 6000K, by changing the various ratios within the linear combination of emission from the blue LED light, the $Eu^{3+}$ emission, and the $Tb^{3+}$ emission. The colorimetric and photometric properties of these spectra are tabulated in the table below. Other CCTs, and myriad non-white spectra, are also achievable.

TABLE 2

| CCT (K) | 2205 | 2718 | 3020 | 4032 | 5036 | 5995 |
|---|---|---|---|---|---|---|
| Δu'v' | −0.0005 | 0.0009 | 0.0005 | 0.0006 | 0.0012 | 0.0004 |
| R1 | 83 | 86 | 88 | 96 | 96 | 94 |
| R2 | 93 | 98 | 96 | 89 | 84 | 82 |
| R3 | 46 | 38 | 36 | 32 | 30 | 29 |
| R4 | 85 | 87 | 88 | 86 | 81 | 80 |
| R5 | 96 | 96 | 93 | 85 | 81 | 79 |
| R6 | 96 | 84 | 78 | 66 | 59 | 57 |
| R7 | 93 | 91 | 88 | 83 | 80 | 79 |
| R8 | 72 | 87 | 91 | 91 | 88 | 87 |
| R9 | 11 | 37 | 47 | 63 | 66 | 73 |
| R10 | 65 | 50 | 44 | 29 | 20 | 16 |
| R11 | 92 | 82 | 77 | 64 | 58 | 56 |
| R12 | 56 | 36 | 30 | 19 | 17 | 17 |
| R13 | 76 | 82 | 86 | 94 | 93 | 91 |
| R14 | 59 | 56 | 55 | 54 | 54 | 53 |
| Ra | 83 | 83 | 82 | 79 | 75 | 73 |
| LER (lm/W) | 351 | 359 | 359 | 350 | 339 | 327 |

Example 3

This example shows how the production of a luminescent composition which shows energy transfer. Analogous procedure can be used to produce the luminescent composition according to the invention.

$LaPO_4:Eu^{3+}$ (5%)+$LaPO_4$:Tb3+ (40%) nanoparticles with tributylamine ligands were synthesized using the following (known in literature) procedure:

A typical recipe for the preparation of $La_{1-x}Ln_xPO_4$ nanoparticles in a high boiling coordinating solvent is as follows:

Dissolve a total of 10 mmol $LaCl_3.6H_2O$ and $EuCl_3.6H_2O$ or $TbCl_3.6H_2O$, with a ratio depending on the desired doping level, in approximately 10 mL of methanol p.a. in a 100 mL 3-neck round-bottomed flask and acquire a clear solution Add 10.9 mL, 10.650 g (40 mmol) tributyl phosphate Remove methanol from solution under vacuum (Schlenk-line), careful with vacuum Add 30 mL (32 g) diphenyl ether Open system, flush afterwards Remove the water released by the hydrated metal chlorides under vacuum at 105° C. (Schlenk line)—water should evaporate around 80-85° C.

Cool down reaction mixture to below 50° C. and add 9.5 mL, 7.41 g (40 mmol) tributylamine to the clear solution (under nitrogen)

Add 7.0 mL of a 2 M solution phosphoric acid in dihexyl ether (dissolve 1.96 g $H_3PO_4$ in 10 mL dihexyl ether under ultrasonification), large vial Heat the mixture to 200° C. for 16 hours and cool reaction mixture to room temperature Separate nanocrystals by centrifuging at 2000 rpm for 5 minutes Wash nanocrystals several times with toluene, careful with adding methanol Dry powder under vacuum The powder should be redispersible in methanol Perform S-ray Diffraction (XRD) measurements to determine whether the $La_{1-x}PO4:Ln_x$ is obtained The following exemplary procedure is provided for making a luminescent composition showing energy transfer:

Nanomaterials are mixed together in the desired weight ratios. This could be either in dried (powder) form, or dissolved/dispersed in a liquid.

A solvent is added; typically 5-20 mL of either water, methanol or ethanol is added to 100-200 mg of nanomaterials.

Mixture is shaken and stirred for a few minutes

Mixture is sonicated for 1.5 hrs

Base piranha solution is prepared in the meantime: concentrated $NH_4OH$ solution (30% in water) is heated to 60 C, the $H_2O_2$ (30% in water) is added in a ~3:1 ratio and reheated to 60 C.

About 15 mL of the base piranha solution is added to the nanopowder dispersion/solution and heated to 60-80 C and stirred for 90 min.

After 30 min. solution/dispersion was cooled to room temperature and centrifuged at 3000 rpm for 10 min Piranha solution was removed after centrifuging, and 5 mL of acidic ethanol was added to wash (pH 4, prepared by adding 0.1 M HCl to ethanol). Mixture was shaken and sonicated for a few minutes to disperse the materials again.

Centrifuged again (3000 rpm, 10 min), removed supernatant and re-mixed in acidic ethanol.

In total particles were washed 5 times with acidic ethanol before adding few mL water Particles were dried in the oven at 120-180 C.

Sample was grinded into a powder

The behavior of the $LaPO_4$ particles obtained using the above procedure is compared to that of $LaPO_4$:Eu (10%)+$LaPO_4$:Tb (40%) nanoparticles (also in a 1:1 weight ratio) which do not exhibit energy transfer, as the $LaPO_4$:Eu (10%) nanoparticles and $LaPO_4$:Tb (40%) nanoparticles are processed separately by the following "dry mixing" process Nanomaterials of interest are weighted in the desired weight ratios, but both put into a different vial (not mixed together). This could be either in dried (powder) form, or dissolved/dispersed in a liquid.

A solvent is added in both vials; typically 5-20 mL of either water, methanol or ethanol is added to 100-200 mg of nanomaterials.

Dispersions are shaken and stirred for a few minutes

Dispersions are sonicated for 1.5 hrs

Base piranha solution is prepared in the meantime: concentrated NH4OH solution (30% in water) is heated to 60 C, the H2O2 (30% in water) is added in a ~3:1 ratio and reheated to 60 C.

About 15 mL of the base piranha solution is added to the nanopowder dispersions/solutions and heated to 60-80 C and stirred for 90 min.

After 30 min. solutions/dispersions were cooled to room temperature and centrifuged at 3000 rpm for 10 min Piranha solution was removed after centrifuging, and 5 mL of acidic ethanol was added to wash (pH 4, prepared by adding 0.1 M HCl to ethanol). Samples were shaken and sonicated for a few minutes to disperse the materials again.

Centrifuged again (3000 rpm, 10 min), removed supernatant and re-mixed in acidic ethanol.

In total particles were washed 5 times with acidic ethanol before adding few mL water Particles were dried in the oven at 120-180 C.

Materials were grinded into a powder.

Materials were put together and mixed by shaking the bottle

Then, the following measurements were performed on both samples (i.e. the sample obtained in example 2 and the sample obtained by the dry mixing)

Figure 4:
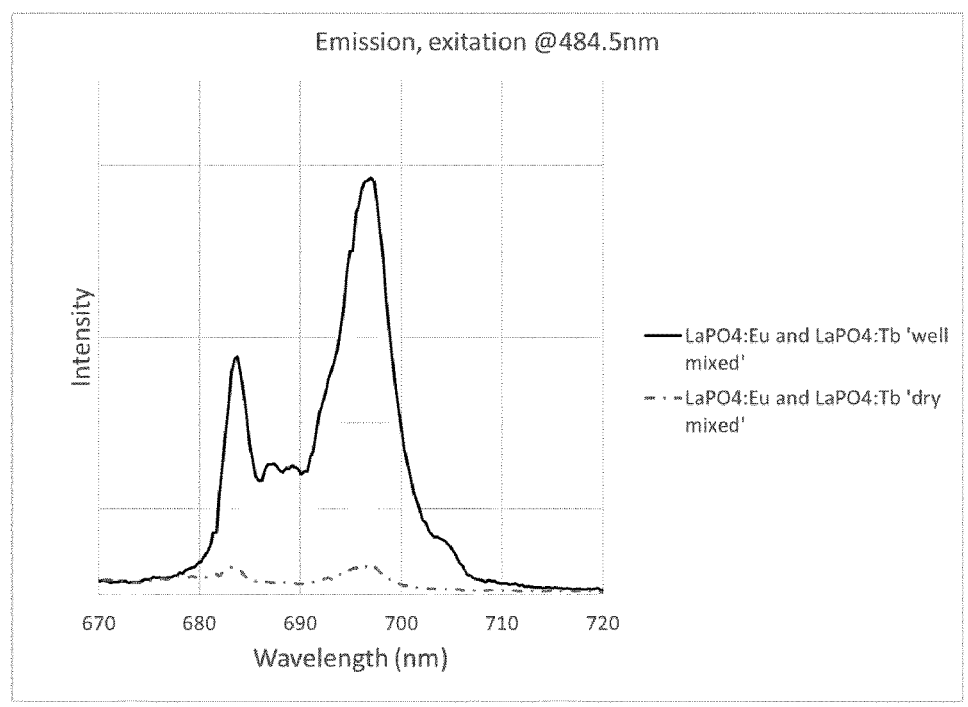
FIG. 4 provides emission spectra from $LaPO_4$:$Eu^{3+}$/ $LaPO_4$:$Tb^{3+}$ mixtures. Excitation at 484.5 nm.

Samples were excited at 484.5 nm, were only Tb is excitable. FIG. 4 shows the emission intensity from 670-720 nm, were only Eu3+ emits light. Clearly, the sample obtained in example 2 shows much more emission in this region, indicating energy transfer from Tb→Eu.

Figure 5:
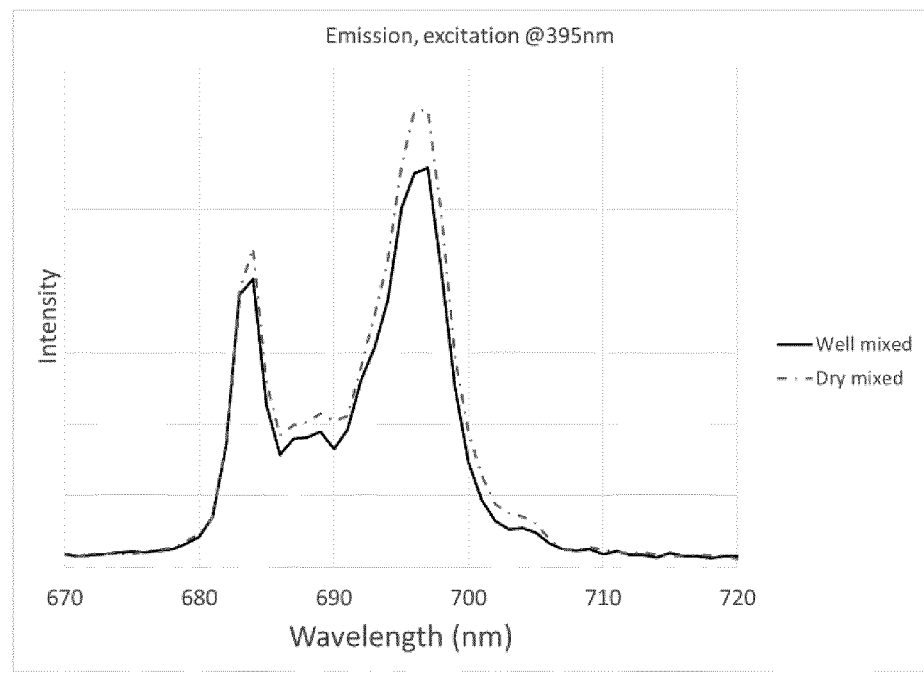
FIG. 5 provides emission spectra from $LaPO_4$:$Eu^{3+}$/ $LaPO_4$:$Tb^{3+}$ mixtures. Excitation at 395 nm.

Samples were excited at 395 nm, were only Eu3+ is excitable and no IFRET processes can take place. FIG. 5 shows that both the sample according to example 2 and 'dry mixed' samples show very similar (Eu3+) emission intensities, indicating that in both mixtures the Eu3+ has very similar activity.

Figure 6:
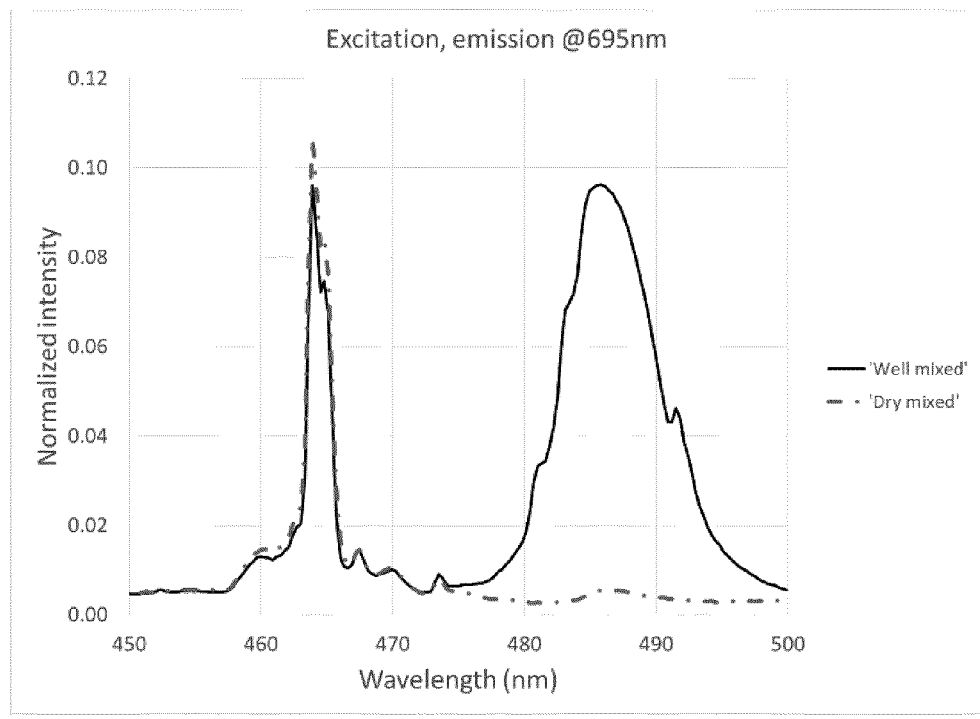
FIG. 6 provides excitation spectra from $LaPO_4$:$Eu^{3+}$/ $LaPO_4$:$Tb^{3+}$ mixtures. Emission at 695 nm.

Excitation spectrum was recorded of the Eu3+ emission at 695 nm, shown in FIG. 6. Only for the sample obtained in example 2 the Tb excitation lines are clearly visible, indicating IFRET mechanisms.

Figure 7:
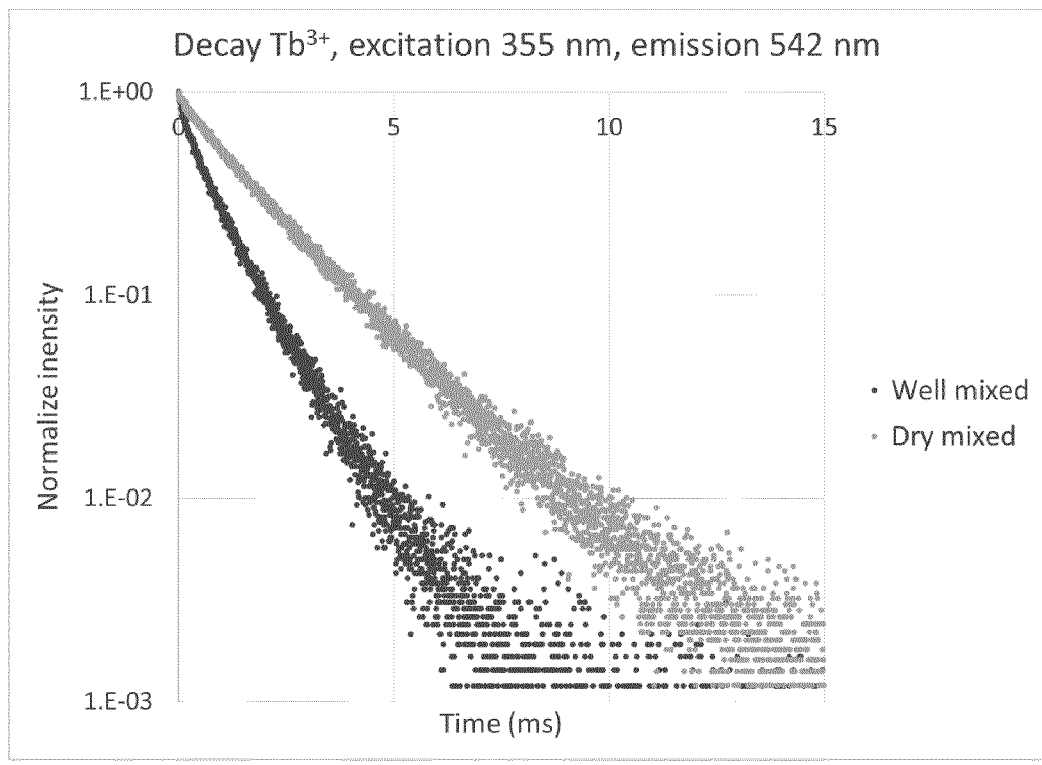
FIG. 7 shows $Tb^{3+}$ decay in $LaPO_4$:$Eu^{3+}$/$LaPO_4$:$Tb^{3+}$ mixtures. Excitation at 355 nm, emission at 542 nm.

FIG. 7 shows the decay of both samples, which is clearly accelerated in case of the sample obtained in example 2, which is a typical signature of non-radiative energy transfer processes.

Example 4

Figure 8:
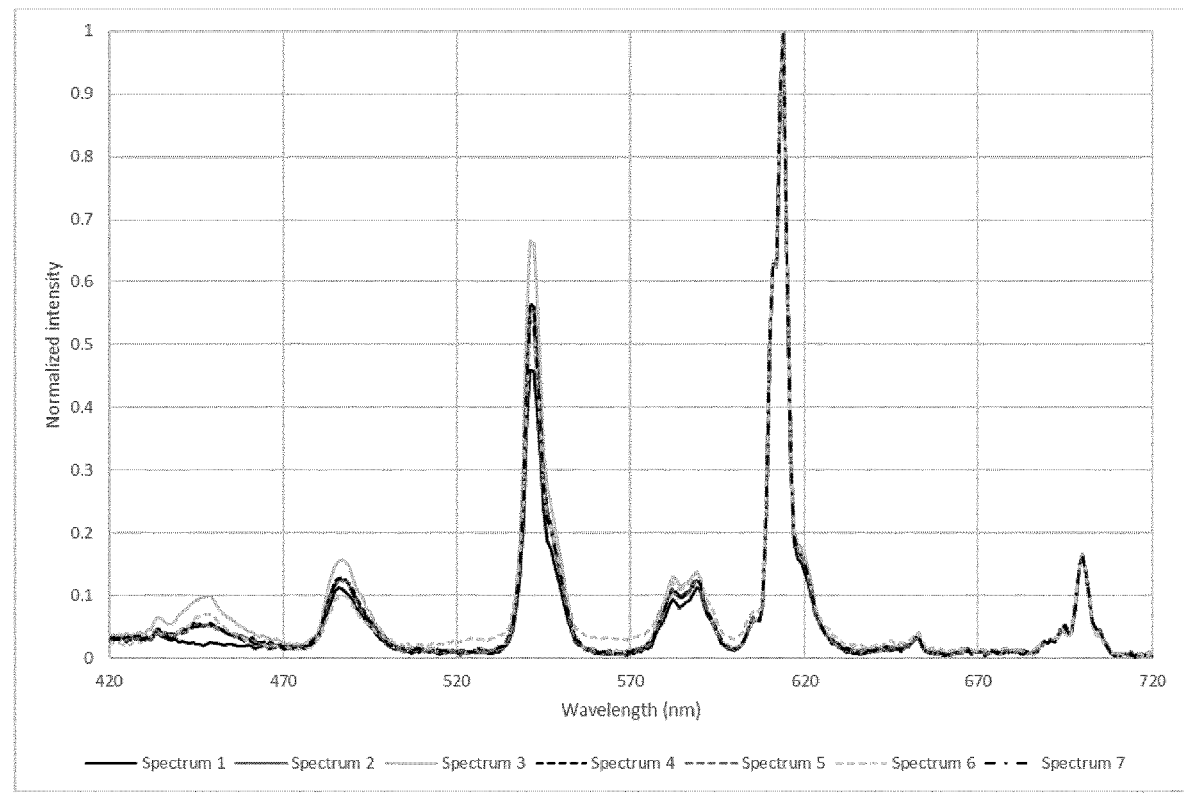
FIG. 8 provides emission spectra from $Li_3Ba_2(Eu_{0.2}Tb_{0.8})_3(MoO_4)_8$/$LaPO_4$:Tb mixtures, optionally including $Y_3Al_5O_{12}$:Ce and/or 450 nm LED FIG. 9 provides the color preference and Lumen Equivalent of Radiation (LER) corresponding to various spectra.
Figure 9:
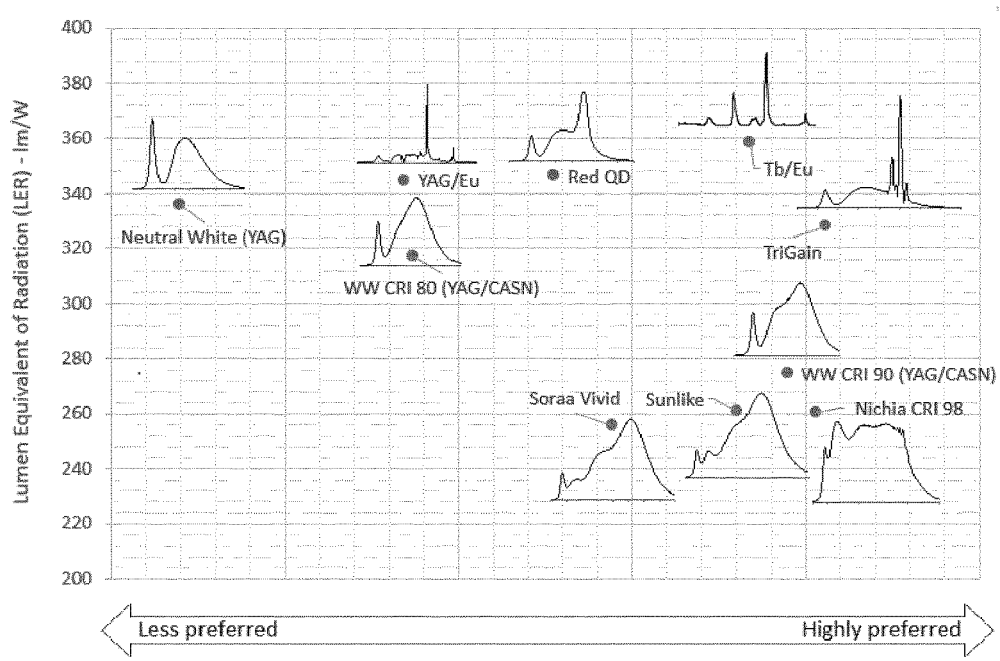

Compositions were made according to the invention. These were excited, optionally in the presence of a 450 nm LED and/or YAG:Ce. The colour fidelity (Rf), color saturation or gamut (Rg), hue angle bin 16 chroma shift (Rcs,h) were measured and/or calculated, as well as the Lumen Equivalent of Radiation (LER), Correlated Color Temperatures (CCT). Using these results, the Preference according to Equation 1 was calculated. These results are detailed in Table 3 below. Further, spectra were taken of the same compositions. Reference is made to FIG. 8. Finally, a plot was made of the LER and preference, including the prior art spectra of prior art materials of FIG. 2, and further including the experimental results of spectrum 5 of this example (Tb/Eu) and an example having YAG as a sensitizer material and an emitter doped with only $Eu^{3+}$ (YAG/Eu). Reference is made to FIG. 9.

It can thus be seen that high CCT and LER values were obtained, while maintaining desirable preference.

TABLE 3

| Sample | Rf | Rg | LER | CCT | Rcs, h16 | Preference |
|---|---|---|---|---|---|---|
| $Li_3Ba_2(Eu_{0.2}Tb_{0.8})_3(MoO_4)_8$ + $LaPO_4$:Tb (spectrum 1) | 85 | 101 | 345 | 2724 | −0.096 | 4.8 |
| $Li_3Ba_2(Eu_{0.2}Tb_{0.8})_3(MoO_4)_8$ + $LaPO_4$:Tb + 450 nm LED (spectrum 2) | 85 | 102 | 349 | 3040 | −0.032 | 4.3 |
| $Li_3Ba_2(Eu_{0.2}Tb_{0.8})_3(MoO_4)_8$ + $LaPO_4$:Tb + 450 nm LED (spectrum 3) | 84 | 102 | 344 | 3513 | 0.010 | 3.9 |
| $Li_3Ba_2(Eu_{0.2}Tb_{0.8})_3(MoO_4)_8$ + $LaPO_4$:Tb + 450 nm LED (spectrum 4) | 85 | 102 | 349 | 3076 | −0.034 | 4.3 |
| $Li_3Ba_2(Eu_{0.2}Tb_{0.8})_3(MoO_4)_8$ + $LaPO_4$:Tb + 450 nm LED (spectrum 5) | 85 | 102 | 348 | 2994 | −0.036 | 4.3 |
| $Li_3Ba_2(Eu_{0.2}Tb_{0.8})_3(MoO_4)_8$ + $LaPO_4$:Tb + $Y_3Al_5O_{12}$ 450 nm LED (spectrum 6) | 84 | 101 | 360 | 3034 | −0.037 | 4.4 |
| $Li_3Ba_2(Eu_{0.2}Tb_{0.8})_3(MoO_4)_8$ + $LaPO_4$:Tb + $Y_3Al_5O_{12}$ 450 nm LED (spectrum 7) | 82 | 103 | 349 | 3093 | −0.039 | 4.5 |

The invention claimed is:

1. Luminescent A luminescent composition, said luminescent composition comprising:
   (i) a first emitting material, said first emitting material having a host lattice doped with $Eu^{3+}$ ions;
   (ii) a second emitting material, said second emitting material having a host lattice doped with $Tb^{3+}$ ions; and
   (iii) a sensitizer material having a host lattice with a garnet structure, doped with $Ce^{3+}$ ions at a doping level of 0.05-5%, which sensitizer material is excitable in the violet-to-blue wavelength range and has an emission spectrum which overlaps at least partly with one or more excitation bands of the first emitting material and which overlaps at least partly with one or more excitation bands of the second emitting material.

2. The luminescent composition according to claim 1, wherein the first emitting material, the second emitting material and the sensitizer material are so arranged to each other to allow energy transfer from the sensitizer material to the first emitting material and/or from the sensitizer material to the second emitter material.

3. The luminescent composition according to claim 1, wherein said host lattice is a $Y_3Al_5O_{12}$ (YAG) or $Lu_3Al_5O_{12}$ (LuAG), or a combination of these two materials.

4. The luminescent composition according to claim 1, wherein the first emitting material and/the second emitting material are in the form of nanoparticles.

5. The luminescent composition according to claim 4, wherein the sensitizer material(s) are provided in the form of nanoparticles.

6. The luminescent according to claim 4, wherein the sensitizer material(s) are provided in the form of a material of which at least one dimension >100 nm.

7. The luminescent composition according to claim 4, wherein the first emitting material is in the form of a core-shell structure, wherein the sensitizer material forms a shell around the first emitter material and/or wherein the second emitting material is in the form of a core-shell structure, wherein the sensitizer material forms a shell around the second sensitizer material.

8. The luminescent material according to claim 1, wherein said sensitizer material comprises a first sensitizer material and a second sensitizer material, and wherein said first sensitizer material is excitable in the violet-to-blue wavelength range and has an emission spectrum which overlaps at least partly with one or more excitation bands of the first emitting material and wherein the second sensitizer material is excitable in the violet-to-blue wavelength range and has an emission spectrum which overlaps at least partly with one or more excitation bands of the second emitting material.

9. The luminescent material according to claim 8, wherein the first emitting material, the second emitting material, the first sensitizer material and the second sensitizer material are so arranged to each other to allow energy transfer from the first sensitizer material to the first emitting material and/or from the second sensitizer material to the second emitting material.

10. The luminescent composition according to claim 1, wherein said first emitting material has a doping level of 2-30% $Eu^{3+}$, and said second emitting material has a doping level of 5-100% $Tb^{3+}$.

11. A light-emitting device, said light emitting device comprising the luminescent material according to claim 1.

12. The light-emitting device according to claim 11, further comprising an excitation source for exciting the at least one sensitizer material.

13. The light-emitting device according to claim 12, wherein the excitation source is a light emitting diode emitting in the range from 400 to 480 nm.

14. The light-emitting device according to claim 11, wherein residual light from the excitation source mixes with light from the first and second materials, to generate white light.

15. The light-emitting device according to claim 14, wherein spectrum of white light is characterized by a Preference as calculated by equation 1 of less than 4.0, $$\text{Preference} = 7.446 - 0.041\, Rf - 9.99\, Rcs,h16 - 0.90\, Rcs,h162 + 106.6\, Rcs,h163 \quad \text{(Equation 1)}.$$

16. The light-emitting device according to claim 14, wherein the spectrum of white light is characterized by a lumen equivalent of radiation that is greater than 330 lumens per Watt.

17. A lighting system comprising a light emitting device according to claim 11.

18. The lighting system according to claim 17, wherein the lighting system is selected from the group consisting of a lamp or luminaire, office lighting systems, household application systems shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, and decorative lighting systems, portable systems, automotive applications, micro-LED based systems, and green house lighting systems.

\* \* \* \* \*